Jan. 5, 1971   C. O. BERRYMAN   3,552,770
SAFETY DEVICE

Filed Nov. 21, 1968   2 Sheets-Sheet 1

INVENTOR
CHARLES O. BERRYMAN
BY Yount, Flynn & Tarolli
ATTORNEYS

Jan. 5, 1971  C. O. BERRYMAN  3,552,770

SAFETY DEVICE

Filed Nov. 21, 1968  2 Sheets-Sheet 2

INVENTOR
CHARLES O. BERRYMAN
BY Yount, Flynn & Tarolli
ATTORNEYS

United States Patent Office 3,552,770
Patented Jan. 5, 1971

3,552,770
SAFETY DEVICE
Charles O. Berryman, Detroit, Mich., assignor to Eaton Yale & Towne Inc., Cleveland, Ohio, a corporation of Ohio
Continuation-in-part of application Ser. No. 662,679, Aug. 23, 1967. This application Nov. 21, 1968, Ser. No. 777,734
Int. Cl. B60r 21/00
U.S. Cl. 280—150                            7 Claims

ABSTRACT OF THE DISCLOSURE

A safety device for protecting an occupant of a vehicle during an accident comprises a confinement supported on the vehicle. The confinement is supported in an inoperative collapsed condition and is expanded to an operative condition upon the occurrence of an accident. One embodiment of the present invention includes a zero reaction diffuser for directing flow from a fluid reservoir into a confinement upon the occurrence of an accident to expand the confinement. Another embodiment includes gas generating material that is activated upon the occurrence of an accident to rapidly produce gas to expand the confinement.

---

This application is in the nature of a continuation-in-part of application Ser. No. 662,679, filed Aug. 23, 1967, now Pat. No. 3,425,712 and is entitled in part to the benefit of the filing date thereof.

The present invention relates to a safety device for protecting an occupant of a vehicle during an accident, and particularly relates to a safety device which operates to restrain movement of the occupant as a result of an accident.

Devices have been suggested for use in vehicles as safety devices which operate to restrain movement of an occupant of the vehicle as a result of an accident. Such devices generally include a fluid supply which operates to inflate an expansible confinement. During an accident, the occupant of the vehicle engages the confinement and his movement is cushioned by the confinement. These devices, in general, depend on the release of fluid from a reservoir of fluid stored under high pressure to expand the confinement. The storage of the fluid under high pressure has many disadvantages, such as the possibility of leakage over a long period of time and the large bulk attributed to the fluid reservoir itself. It has been suggested that gas generating material, as illustrated in a copending application Ser. No. 773,269 filed Nov. 4, 1968 by Robert L. Martin, assigned to the same assignee, be used to expand the confinement and overcome the disadvantages attributed to the fluid reservoir. However, the use of gas generating material also presents the problem of where to locate the gas generating material so that it will be in an operable condition to expand the confinement when it is actuated. The present invention provides a solution to the problem by utilizing a coating comprised of gas generating material located on an interior surface of the confinement.

In known safety devices, during expansion of the confinement by fluid flow from a reservoir through a diffuser high frequency sound is created by the fluid exiting from the diffuser member to expand the confinement. The creation of this high frequency sound by the rush of fluid through the openings of the diffuser member can have a very detrimental effect on the ears of the occupant of the vehicle. The present invention overcomes this problem by providing a sound absorbing lining in the confinement which will absorb high frequency sound.

Moreover, generally in known safety devices when the fluid reservoir is opened fluid impacts upon the diffuser member with exceedingly high forces. Therefore, the diffuser member must be constructed so as to be able to withstand these high forces without breaking loose from its mountings. Otherwise, the occupant of the vehicle would be subjected to the danger of being struck by the diffuser member if it broke loose. This generally necessitates a rather bulky construction. To overcome this problem, applicants have devised a zero reaction diffuser whereby the reactionary forces caused by the fluid flow from the diffuser and the fluid impacting radially upon the diffuser will be distributed in such a manner as to have a net sum of zero. The result is a zero reaction diffuser. The utilization of a zero reaction diffuser provides a way to simplify the mounting and construction of the diffuser without compromising the safety of the occupant of the vehicle.

Accordingly, an important object of the present invention is the provision of a new and improved safety device for a vehicle which includes an expansible confinement which operates to restrain movement of an occupant of a vehicle during an accident and a zero reaction diffuser which is operable to control fluid flow from a fluid reservoir to expand the confinement.

Still another object of the present invention is the provision of a new and improved safety device for a vehicle having an expansible confinement for restraining movement of an occupant of the vehicle during an accident and a sound absorbing lining associated with the interior of the confinement and operable to at least partially absorb the sound associated with the expansion of the confinement.

A further object of the present invention is the provision of a new and improved safety device for a vehicle having an expansible confinement, a diffuser member operable to direct fluid to expand the expansible confinement and a sound absorbing lining located in the interior of the confinement and operable to effectively absorb the high frequency sounds associated with fluid flow through the diffuser member to expand the confinement.

A still further object of the present invention is to provide a new and improved safety device for a vehicle including an expansible confinement which operates to restrain the movement of an occupant of the vehicle during an accident and a gas generating material coated on an interior portion of the confinement and operable upon activation to rapidly create gas to effect expansion of the confinement.

Further objects and advantages of the present invention will be apparent to those skilled in the art to which it relates from the following detailed description of preferred embodiments thereof made with reference to the accompanying drawings in which.

The present invention provides a new and improved safety device for protecting an occupant of a vehicle during a crash. The device is capable of use in automobiles, trucks, airplanes, etc., for the protection of the occupant therein during an accident. In general, the device functions to restrain movement of the occupant during an accident to prevent forceful impact of the occupant against a structural part of the vehicle.

Figure 1:
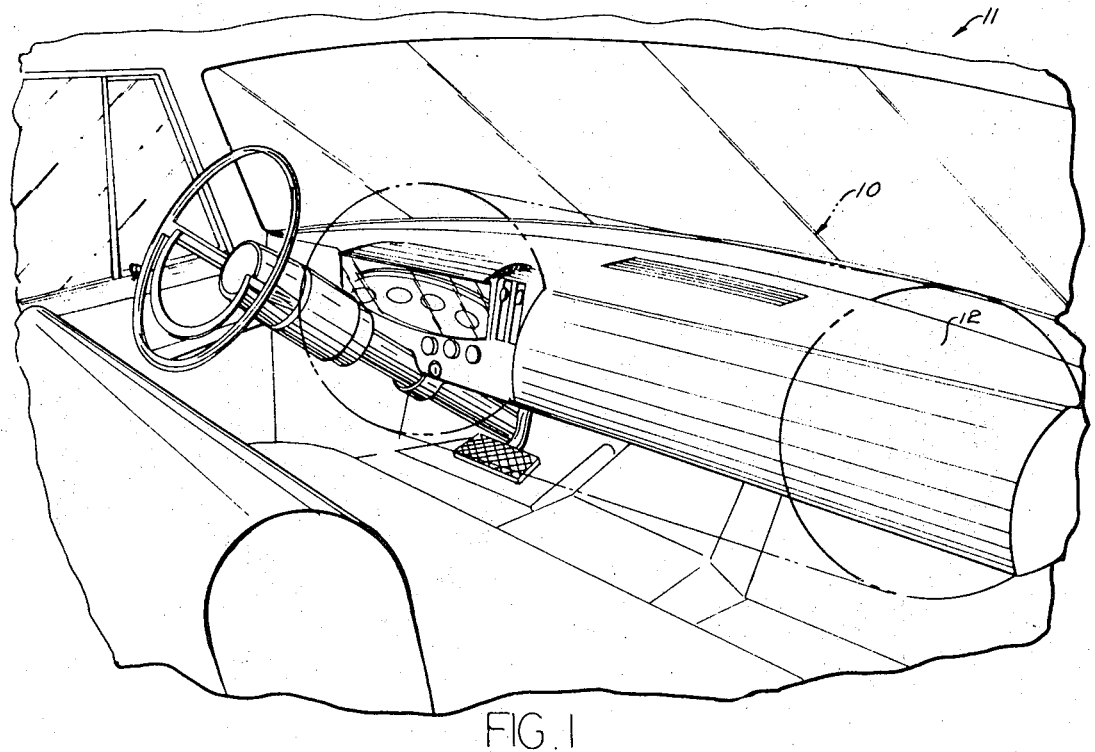
FIG. 1 is a perspective schematic view illustrating an embodiment of the present invention in one manner of application in a vehicle.

As representing the preferred embodiment of the present invention, FIG. 1 of the drawing illustrates a safety device 10 applied to an automotive vehicle 11. The safety device 10 is associated with the dash 12 of the vehicle 11. The safety device 10 includes a confinement 13 having a contracted or inoperative condition, shown in FIG. 2, and an expanded or operative condition, shown on a different scale in FIG. 3.

The confinement 13 comprises wall means 14 which encircles, and defines, a chamber 15. The wall means 14, when contracted, has an accordion-like or bellows portion 16, which may be defined as folded, and a forward portion 17 on which a panel 18 may be mounted. The panel 18 comprises a panel forming a part of the dash and which is styled so as to appear as a portion of the dash when the confinement 13 is in its contracted condition. Moreover, the confinement 13 could be mounted in the back of the front seat of the vehicle 11 or in a door of the vehicle 11 to move toward an occupant of the vehicle 11 and restrain movement of the occupant of the vehicle 11 during an accident. Moreover, the confinement 13 could be mounted without being associated with the panel 18.

Figure 2:
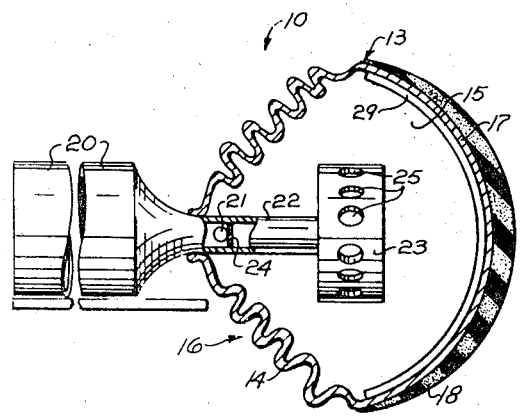
FIG. 2 is a schematic view illustrating the confinement shown in FIG. 1 in its contracted or inoperative condition.
Figure 3:
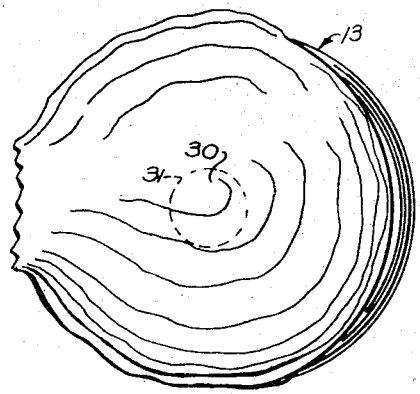
FIG. 3 is a schematic view illustrating the confinement of FIG. 1 in its expanded or operative condition.

The confinement 13 is moved from its contracted condition to its expanded condition, shown in FIG. 3, by the application of fluid pressure in the chamber 15. Suitable means is provided for expanding the confinement from the contracted condition shown in FIG. 2 to the expanded condition shown in FIG. 3. The means for expanding the confinement includes a fluid reservoir or supply 20. The fluid supply or reservoir 20, when released, provides a stream of fluid which flows to the chamber 15. The fluid is released from the reservoir 20 upon detonation of an explosive 21 which may be located in an outlet conduit 22 leading from the reservoir 20 to a diffuser member 23. The explosive 21 is associated with a diaphragm 24 and, when detonated, breaks the diaphragm 24 and permits the fluid to flow through the conduit 22 to the diffuser 23. The explosive 21 may be detonated by a sensor device mounted on the vehicle and which completes a circuit upon a predetermined deceleration of the vehicle 11.

The conduit 22 engages a centrally located portion of the annular diffuser member 23. The longitudinal axis of the conduit 22 is substantially located on the longitudinal axis of the diffuser member 23 so that fluid enters the diffuser member at a centrally located portion thereof from the conduit 22 when the explosive 21 is actuated. Surrounding the centrally located or hub portion of the diffuser member 23 is an annular wall having a plurality of fluid openings 25 therein. The fluid openings 25 communicate with the interior of the confinement 13 for directing fluid to expand the confinement. The fluid openings 25 are of substantially equal transverse dimensions and each is located diametrically opposite to another one of the fluid openings. This provides a zero reaction in the diffuser member due to fluid flow therethrough.

The fluid openings 25 direct the flow of fluid radially of the longitudinal axis of the diffuser member 23 and the conduit member 22. While the fluid openings in the illustrated embodiment of the invention are of an even number and are diametrically located, it is contemplated that an odd number of fluid openings, spaced circumferentially apart equally, would also provide dynamic balance when fluid flows through the diffuser member 23. The generally cylindrical diffuser member 23 is coaxial with the conduit 22 and therefore the flow of fluid from the conduit 22 impinges perpendicularly against the inner annular surface of the diffuser member. However, due to the arrangement of the openings 25 the force from the fluid acting on the diffuser 23 is equally disposed on the circumference of the diffuser. Therefore the radial force vectors acting on the diffuser 23 cancel each other out and have a net sum of zero. Moreover, the reaction forces resulting from flow through the diffuser 23 cancel each other. Thus, the forces which would tend to disengage the diffuser member from its mountings are minimized and the diffuser 23 is substantially free of movement and vibration during the flow of fluid therethrough. Moreover, because the reaction forces are equally disposed along the circumference of the diffuser the chance of having the diffuser member rip off its mounting and endanger the safety of the occupant are minimized.

The fluid which flows into the chamber 15 impinges on the interior surface of the confinement 13 and expands the confinement 13 due to the impingement and pressure rise of the fluid thereon. The fluid rushes from the openings 25 and impinges against the confinement 13 at a substantially high velocity. The sound of the fluid impinging on the confinement is coupled with the sound of the fluid exiting through the fluid openings 25 of the diffuser member 23. The fluid flows through the openings 25 of the diffuser member at a sonic speed. This effects a plurality of small streams of fluid exiting through the openings 25 into the confinement 13 which initially has a substantially lower fluid pressure therein. The small streams of fluid exit through the openings 25 and then rapidly expand to fill and expand the confinement 13. These small streams of fluid emit a high intensity sound wave. Moreover, the rapid flow of fluid through the fluid openings 25 also tends to create a high frequency sound wave which can be very detrimental to the ears of the occupant of the vehicle. Thus, the occupant of the vehicle is subjected to relatively high intensity and high frequency sounds caused by the fluid exiting through the diffuser member at sonic speed. Therefore, a sound absorbing lining 29 is applied to the interior walls of the confinement 13 to suppress the noise level that the occupant is subjected to during an accident and eliminate the danger of injury to the ears of the occupant.

The sound absorbing lining 29 is attached to the interior walls of the confinement 13 by suitable means such as an adhesive binding. The lining is preferably constructed of a yieldable sound absorbing material, such as, cork or a fabric type material so that when the confinement moves from its folded or inoperative position to its expanded or operative position the material will not shatter and thus become inoperative. Any material besides cork, such as a flocking material, could be used as long as it functions to deaden the sound being emitted from the confinement 13 during its expansion. The sound absorbing lining will be operative to absorb a substantial part of the high intensity and high frequency sound associated with the expanding of the confinement 13 as hereinabove discussed.

The wall means 14 of the confinement 13 are made of a material which is deformable and substantially non-elastic so that when it is deformed, it will retain the position to which it is deformed. Moreover, the material is self-supporting. Preferably, the confinement 13 is made of sheet steel of approximately 15 ml. thickness. The material of which the confinement is made may vary depending upon forces which it is to encounter.

As the fluid flows into the confinement 13, the accordion portion 16 of the confinement 13 is expanded and deformed by the flow of fluid into the chamber 15, causing an expansion of the confinement 13 to the condition illustrated in FIG. 3, and as shown generally by the dotted lines in FIG. 1. The expansion of the confinement 13 by the flow of fluid thereinto causes a deformation of the metal beyond its elastic limit and the confinement retains the position to which it is expanded by the fluid. The kinetic energy of the fluid rushing into the chamber 15 is absorbed by the deformation of the wall means 14 of the confinement 13, and particularly the bellows portion 16 thereof. As a result, the expansion of the confinement 13 to its condition shown in FIG. 3 is controlled and does not occur in the same manner as in a highly flexible confinement wherein the rush of fluid must be controlled by some sort of diffuser or the like to prevent substantial impact of the confinement against an occupant of the vehicle 11.

The confinement 13 expands so as to be displaced in a position adjacent the occupant of the vehicle. In the modification shown in FIG. 1, the confinement 13 expands toward the occupant located in the front seat of the vehicle. The confinement 13, if mounted in the back of the front seat of the vehicle, would expand toward a passenger in the back seat of the vehicle. Moreover, the confinement 13 could be mounted in association with the steering wheel and steering column of the vehicle so as to move toward the driver of the vehicle when expanded. When the confinement 13 is expanded to a condition such as shown in FIG. 3, the confinement fills a major portion of the area between the occupant of the vehicle and a structural part of the vehicle. Specifically, the confinement 13 is disposed to receive the impact of movement of an occupant of the vehicle during an accident.

Figure 4:
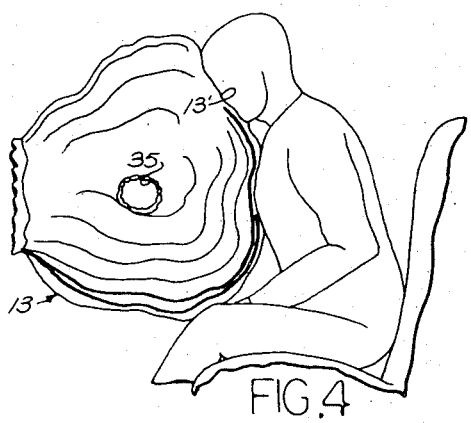
FIGS. 4, 5 and 6 are views illustrating the operation of the confinement during an accident wherein the occupant of the vehicle moves against the confinement multiple times.

The occupant of the vehicle during an accident may be thrown against the expanded confinement 13, as shown in FIG. 4. The impact of the occupant against the confinement 13 may be sufficient to result in deformation of the walls of the confinement 13, as illustrated in FIG. 4. Any deformation of the walls of the confinement 13 due to the impact of the occupant against the confinement 13 cushions the movement of the occupant. The walls, by deforming, absorb the energy of the impact of the occupant, and thus minimize the rebound of the occupant from the confinement 13, as well as protect the occupant from serious injury by impact with solid structural parts of the vehicle, such as the windshield, etc. In addition to the deformation of the material of the confinement 13 absorbing the energy of the impact with the occupant, any fluid in the confinement 13, likewise, will absorb the energy of impact of the occupant against the confinement 13 and assist in restraining the occupant.

Figure 5:
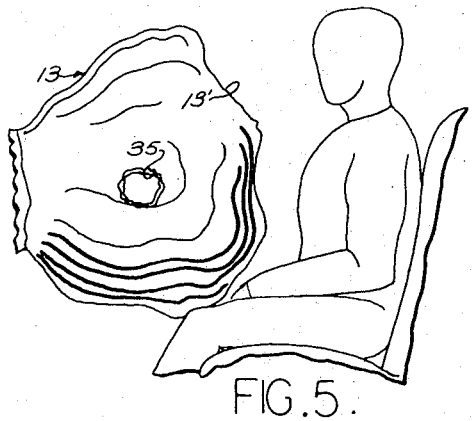

The confinement being made of a rigid material which retains its form remains in a substantially expanded condition, such as shown in FIG. 5, upon termination of a force causing deformation of the confinement 13. Thus, if an occupant rebounds from the confinement 13 or is thrown therefrom, the confinement 13 will remain in the condition to which it was deformed. This is illustrated in FIG. 5 where the occupant is shown thrown from the confinement 13 and the confinement 13 remains expanded but deformed, as indicated by the line 13', as a result of the initial impact of the occupant. This is the case, even if the fluid flow into the confinement ceases.

Figure 6:

The occupant of the vehicle may rebound from the confinement 13 when the vehicle is involved in an accident where there is a multitude of collisions, as may occur when the vehicles strikes another car and rebounds from that car and hits a pole. On the first collision, the occupant would be thrown forward against the confinement 13, and may then be thrown away from the confinement 13. On the second collision, the occupant may be again thrown forward; however, the confinement 13 would still be in position to cushion the second forward movement of the occupant, as shown in FIG. 6, even though fluid flow may have terminated, and pressure in the chamber 15 is atmospheric. Thus, the confinement 13 of the present invention is especially suitable for protecting the occupant of a vehicle where the vehicle collides with a number of objects.

The confinement 13 of the present invention is provided with a suitable relief means for minimizing pressure buildup in the confinement and which minimizes rebound of the occupant from the confinement. The relief means may take many different forms. For example, it may comprise a perforated disk which is formed over an opening in the confinement; it may comprise a blow-out disk which blows out and communicates the chamber 15 with the atmosphere upon a pressure slightly in excess of atmospheric pressure being developed therein; or it may comprise a weakened area of the walls of the confinement which releases upon a predetermined pressure increase in the chamber 15.

As shown in the drawings, the relief means comprises an area of the walls of the confinement designated 30. The area 30 is defined by a suitable score line 31 formed in the confinement 13 which weakens the wall of the confinement 13. The flow of fluid from the supply reservoir 20 into the chamber 15 results in a slight pressure increases on the area 30 which blows out of the wall to provide a hole or opening 35 in the confinement, as shown in FIG. 4. Alternatively, the opening 35 may be achieved as a result of an increase in pressure in the confinement 13 when the occupant strikes or impacts against the confinement 13. The relief means provides a release for excess pressure in the confinement and results in minimizing the rebound of the occupant from the confinement.

The volume of fluid supplied by the reservoir 20 is substantially in excess of the volume of fluid required to expand the confinement 13 and fill the chamber 15. Thus, a continuous flow of fluid is provided through the opening 35 while the occupant moves against the confiement, during the initial collision of the vehicle with an obstruction. The continuous flow of fluid also impinges against the walls of the confinement, and continuously flows through the opening 35 provided by the area 30 as long as a pressure differential exists between the chamber 15 and the atmosphere.

Moreover, as has been described hereinabove, the confinement 13 will remain in a deformed condition, even though the flow of fluid to the confinement 13 terminates. This is quite a distinction from fabric confinements wherein the confinement is not made of a form retaining material but rather deflates when the fluid pressure in the confinement decreases. This aspect of the present confinement makes it particularly suitable for use in vehicles to better ensure occupant safety in an accident where the occupant may be thrown a number of times against the confinement.

Furthermore, the fact that the confinement is made of a metal material which is substantially stronger than a fabric material, the possibility of an opening or hole being formed in the confinement by a sharp object or the like which would render the confinement ineffective and inoperable during an accident, is minimized. Thus, the fact that the confinement is made of metal material rather than a fabric material does render the confinement more reliable.

Figure 7:
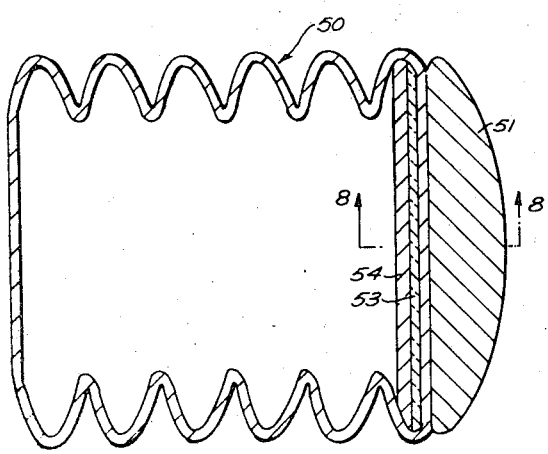
FIG. 7 is a schematic sectional view illustrating a preferred embodiment of a confinement embodying the present invention.
Figure 8:
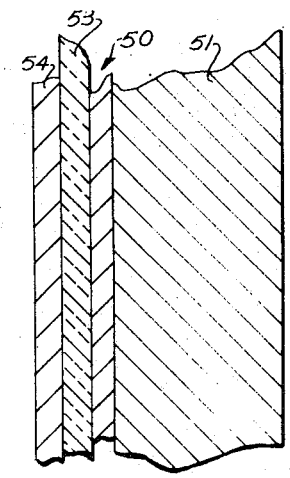
FIG. 8 is an enlarged fragmentary sectional view of a portion of the structure shown in FIG. 1.

Another embodiment of the present invention is illustrated in FIG. 7 wherein rather than the use of a supply of fluid, such as the supply 20 shown in FIG. 2, a gas generating material is coated on a portion of the interior of the confinement 50. By the use of a gas generating material coated on an interior portion of the confinement certain problems associated with the use of a fluid reservoir are alleviated. Namely, the problem of locating the bulky fluid reservoir on the vehicle and the problem associated with the storage of a fluid under high pressure. Moreover, by using a gas generating material coated on an interior portion of the confinement the need for a diffuser is eliminated, as will be discussed hereinbelow.

The gas generator 54 is composed of a gas generating material that is operable upon actuation to produce gas at an extremely rapid rate to expand the confinement 50. The interior wall of the confinement is provided with a thermal protective lining 53, such as, asbestos or the like, and the exterior walls of the confinement 50 include a pad 51 mounted thereon forming a portion of the interior of the vehicle upon which the embodiment is mounted. The thermal protective lining 53 is operable to protect the bag from excessive heat effected by the operation of the gas generator.

The gas generating material is composed of a flammable material that is ignited to rapidly produce gas. A suitable means is engaged with the material to ignite the gas generating material in response to the vehicle entering an accident. Any suitable ignition device could be used to ignite the gas generating material. For example, a bridgewire or high resistance wire, such as nickel chromium wire, could be attached to the gas generating material to ignite the material in response to an accident. A current from an accident sensing device would be passed through the wire to heat the wire and ignite the gas generating material. Although a thermal protective lining 53 is contemplated, it should be apparent that a gas generator could be attached directly to the confinement 50 if the confinement is constructed of sheet metal or other materials whose flexible qualities are essentially non-sensitive to heat. The sheet metal would not be affected by the high burning temperature of the gas generator.

In the present embodiment the gas generator consists of a gas generating material coated on an interior portion of the confinement 50. Specifically the coating is applied to the thermal protective lining 53 located on the interior walls of the confinement. Because the coating is disposed over a considerable area the need for a diffuser is eliminated. Instead of having the gas enter the bag through an orifice of a small diameter the gas generating material causes the gas to be generated over a large portion of the interior of the confinement. The gas generator 54 will be ignited upon the occurrence of an accident. Upon ignition the gas generating material will burn rapidly to produce gas and expand the confinement 50.

Moreover, because the gas generating material is disposed over a large portion of the confinement combustion of the material will occur at a considerably higher rate than if the material was compressed into one smaller area. Thus, inflation of the confinement will occur at a higher rate than that of known gas generating devices.

What I claim is:

1. Safety apparatus for protecting an occupant of a vehicle during an accident comprising a confinement having a collapsed inoperative and an expanded operative condition for restraining movement of the occupant during an accident, means for expanding said confinement to dispose said confinement in said expanded operative condition, said means for expanding said confinement comprising a fluid source, means providing for flow of fluid from said source to expand said confinement, a diffuser member associated with said source and operable to direct the fluid flow to expand said confinement, a diffuser member associated with said source and operable to direct the fluid flow to expand said confinement, said diffuser member having a plurality of openings enabling fluid to flow therefrom, and the force vectors of the reaction of the fluid flow from the diffuser member having a net sum of approximately zero, said confinement including a sound absorbing lining located therein to absorb at least part of the sound associated with the expansion of said confinement.

2. Safety apparatus as defined in claim 1, wherein said zero reaction diffuser includes a plurality of openings having generally the same transverse dimensions spaced an equal distance apart around the circumference of the diffuser.

3. Safety apparatus for protecting an occupant of a vehicle comprising a confinement having a collapsed inoperative condition and an expanded operative condition for restraining movement of the occupant during an accident, means for expanding said confinement to dispose said confinement in said expanded operative condition, a sound-absorbing lining in said confinement operable to absorb at least a part of the sound associated with the expansion of said confinement, said means for expanding said confinement including a fluid supply and means for providing for fluid flow from said fluid supply to expand said confinement, said means for providing for fluid flow including a diffuser means, said sound-absorbing lining being operable to absorb the sound created by the flow of fluid through said diffuser means, said diffuser means comprising a zero reaction diffuser member having a plurality of openings for directing flow therefrom so that the force vectors of the reaction of the fluid flow from the diffuser member have a net sum of approximately zero.

4. Safety apparatus for protecting an occupant of a vehicle comprising a confinement having a collapsed inoperative condition and an expanded operative condition for restraining movement of the occupant during an accident, means for expanding said confinement to dispose said confinement in said expanded operative condition, a sound-absorbing lining in said confinement operable to absorb at least a part of the second associated with the expansion of said confinement, said means for expanding said confinement including a fluid supply and means for providing for fluid flow from said fluid supply to expand said confinement, said means for providing for fluid flow from said fluid supply into said confinement including a zero reaction diffuser member having a plurality of openings having generally the same transverse dimension spaced an equal distance apart around the circumference of the diffuser member and wherein the force vectors of the reaction of the fluid flow from the diffuser member have a net sum of approximately zero.

5. In a safety apparatus for protecting an occupant of a vehicle during an accident comprising a confinement having a collapsed inoperative condition and an expanded operative condition for restraining movement of the occupant during an accident, a fluid source, and means providing for flow of fluid from said source to expand said confinement, the improvement comprising a diffuser member operable to direct the fluid flow to expand said confinement, said diffuser member including expansion chamber means, means providing fluid communication between said expansion chamber means and said fluid source, said expansion chamber means having dimensions substantially greater than the dimension of the fluid communication means whereby the fluid expands as it passes from said fluid communication means into said expansion chamber means, said expansion chamber means having a plurality of openings enabling fluid to flow therefrom into the interior of the confinement, said openings being arranged to direct streams of fluid in a plurality of directions with the force vectors of the reaction of the streams of fluid flow from the diffuser member having a net sum of approximately zero, each of said openings being arranged to direct the streams of fluid in a direction generally transverse to the path of movement of said confinement as it is expanded toward the occupant of the vehicle.

6. In a safety apparatus for protecting an occupant of a vehicle comprising a confinement having a collapsed inoperative condition and an expanded operative condition and means for expanding the confinement by providing for fluid flow thereinto, the improvement comprising a sound-absorbing lining for absorbing at least a part of the sound associated with expansion of the confinement, and means for securing said sound-absorbing lining to the confinement.

7. In a safety apparatus as defined in claim 6 wherein said sound-absorbing lining comprises a yieldable material and said means for securing said sound-absorbing lining to the confinement comprises a adhesive bonding material.

References Cited

UNITED STATES PATENTS

| | | | |
|---|---|---|---|
| 3,080,138 | 3/1953 | Church | 244—31 |
| 3,450,414 | 6/1969 | Kobori | 280—150 |
| 3,411,807 | 11/1968 | Carey et al. | 280—150 |

KENNETH H. BETTS, Primary Examiner